May 18, 1948.  W. G. HOELSCHER  2,441,764
COLUMN LUBRICATION FOR RADIAL DRILLS
Filed Nov. 1, 1943  2 Sheets-Sheet 1

INVENTOR.
William G. Hoelscher
BY Wood, Arey, Herron & Evans
Attorneys.

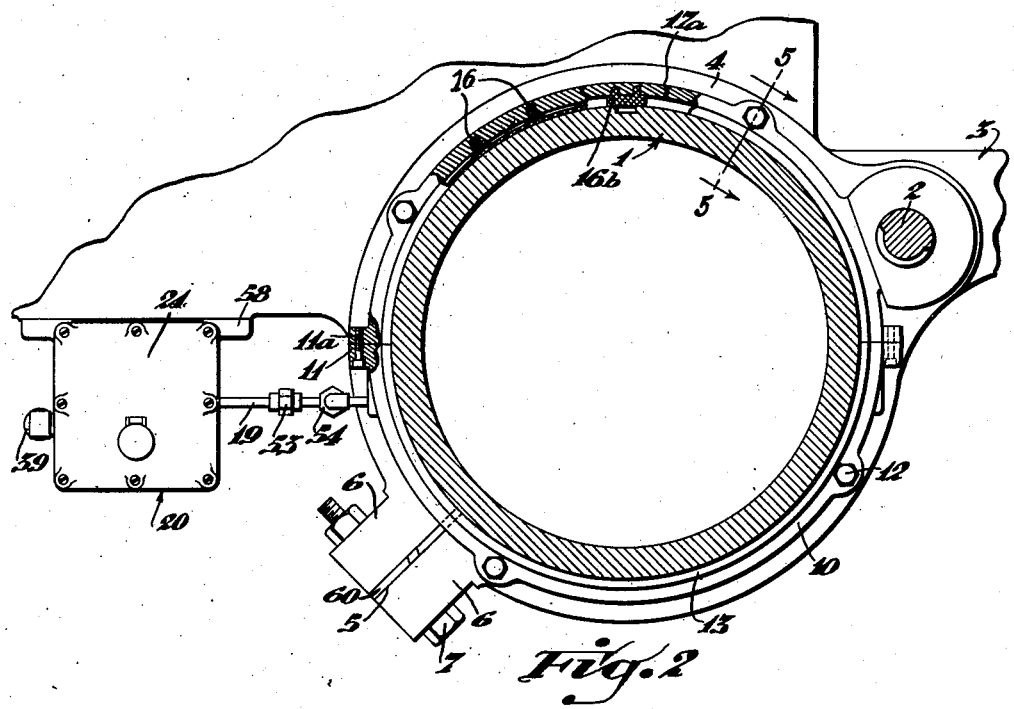
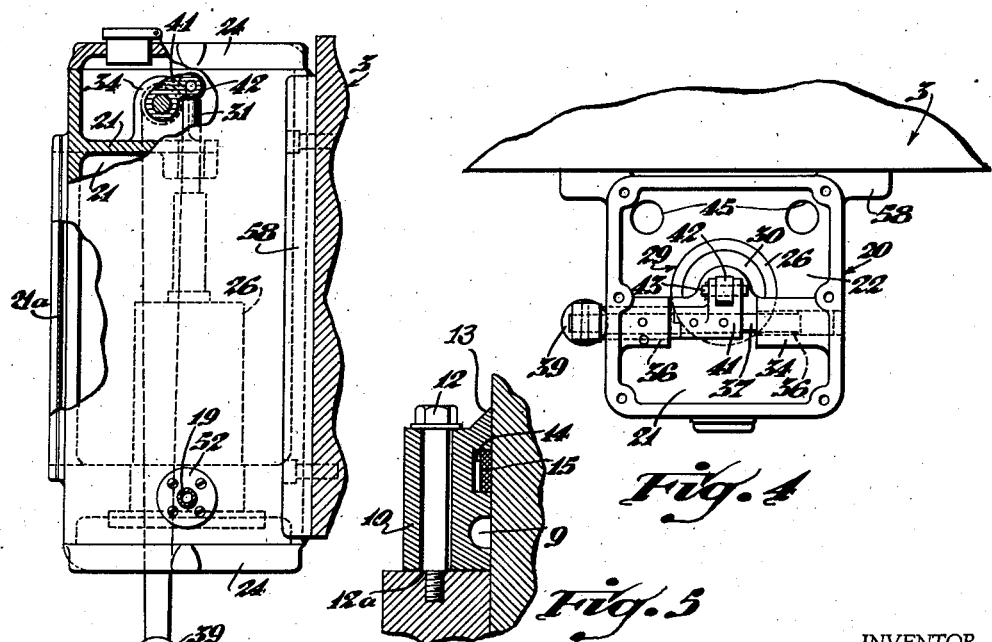

Patented May 18, 1948

2,441,764

UNITED STATES PATENT OFFICE 2,441,764

COLUMN LUBRICATION FOR RADIAL DRILLS

William G. Hoelscher, Cincinnati, Ohio, assignor to The American Tool Works Company, Cincinnati, Ohio, a corporation of Ohio Application November 1, 1943, Serial No. 508,600

8 Claims. (Cl. 184—6)

This invention relates to lubricating apparatus for machine tools and is disclosed particularly in the environment of a radial drill as a system for maintaining a film of oil between the column and the arm which may be raised and lowered on it. The arm, carrying the drill head and driving mechanism, is a very heavy unit and embraces the column in a sleeve which is snug fitting in order that the machine may have the desired rigidity. A power driven mechanism is provided for raising the arm upon the column; and, at various times during the working day the arm is raised or lowered, as the case may be, to adjust the drill head to the height desired over the work.

Heretofore it has been conventional to apply oil to the column at opposite ends of the arm sleeve by means of a brush or oil can. Lubrication in this manner, however, has been unsatisfactory; it is dependent upon the operator and frequently is neglected. Still more important, the leading edge of the sleeve, depending upon whether the arm is being raised or lowered, wipes the oil from the column surface with the result that a limited amount of lubricant at best finds its way between the mating surfaces. The unit bearing surfaces, however, are so heavy that acute wear is encountered unless lubrication adequately is maintained.

The principal objective of the present invention has been to provide a simple lubricating apparatus which will reliably and conveniently furnish a supply of oil to meet such requirements. The invention, briefly, contemplates a radial drilling machine in which annular recesses are provided adjacent the opposite ends of the arm sleeve. These recesses which may be located in the sleeve itself or in supplemental rings fastened to the ends of the column, as described at a later point in the specification, extend circumferentially around the column and constitute channel ways within which pools or adequate supplies of oil may be maintained awaiting movement of the arm in a raising or lowering direction of it. Thus, if the column moves upwardly, oil from the upper annular recess of the arm provides the column surface with a film of oil for lubricating successive lower portions of the sleeve as they move past; while the lower recess provides a similar result during lowering. From time to time the supply of oil in the recesses is used up, the rate depending upon the frequency with which the arm is raised or lowered during the working day. In accordance with this invention, the oil supply within the recesses is replenished from time to time through a pump having a lever which conveniently may be manipulated by the operator. The pump preferably comprises a unitary block or casting incorporating a reservoir, a cylinder, and a plunger slidable within the cylinder, while a lever pivotally mounted is provided to effect oil feeding movements of the plunger and thereby charge oil into the recesses. The recesses preferably are connected in parallel so as to be fed from the pump in unison.

From the foregoing principles of the present invention and from the following detailed description of the preferred embodiment of the apparatus, those skilled in the art readily will comprehend the various modifications to which the invention is susceptible.

In the drawings:

Figure 2 is a horizontal sectional view taken transversely through the column showing the lubrication apparatus in plan view.

Figure 3 is a fragmentary elevation showing details of the pump construction.

Figure 4 is a fragmentary plan view looking down upon the pump with the cover thereof removed.

Figure 5 is a fragmentary sectional view taken on the line 5—5 of Figure 2.

Figure 1:
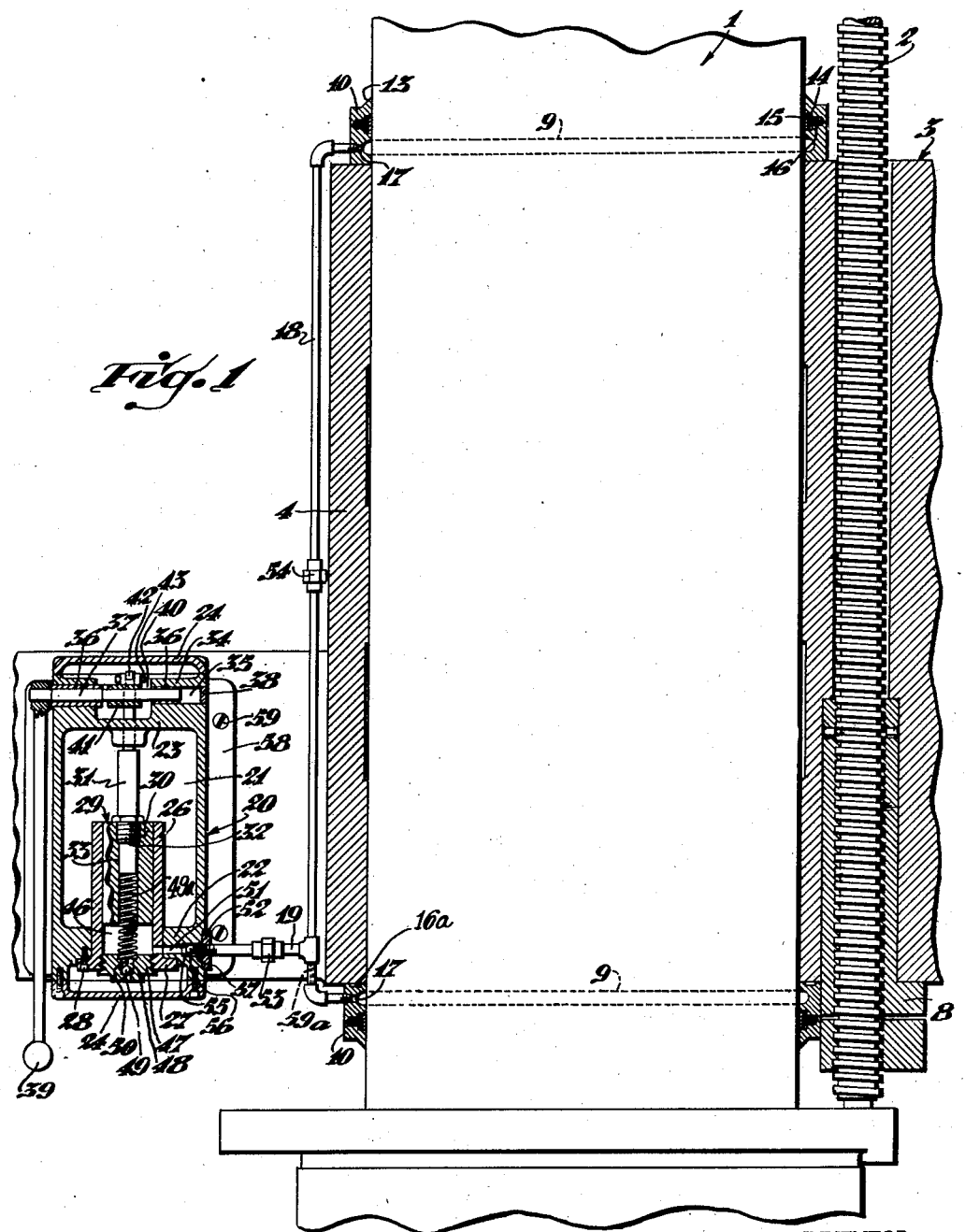
Figure 1 is a sectional elevation taken through the arm of the machine to show the lubrication channels at the ends of the column sleeve, the lubrication pump and distribution system from it to the channels.

The radial drill in which the present apparatus is embodied may be of the usual type and details thereof, such as the base, the arm and head which is carried by it, are not shown in detail. In the drawings, the column is indicated generally at 1. It is provided with the usual cap, not shown, from which an elevating screw 2 is suspended. The column is embraced by the arm, indicated generally at 3, through a sleeve portion 4 which is bored to fit over the column in snug relationship thereto. The sleeve portion 4 of the arm is split longitudinally as at 5 and the usual lugs 6 are provided to receive screws 7 through manipulation of which the sleeve 4 may be contracted in diameter for clamping purposes. In place of the bolts 7 other suitable clamping devices may be employed. It will be understood that the arm carries the usual nut 8 which is traversed by the screw 2, so that relative rotation between the nut and screw effects a raising or lowering movement of the arm upon the column.

At opposite ends of the sleeve portion of the arm annular recesses 9 are located so as to extend circumferentially around the column. In the preferred embodiment these recesses are provided in rings 10, which preferably are of the split type, in order that they may be installed conveniently around the column and embrace it throughout its periphery. The respective portions forming a complete ring are provided with bosses 11 through which drawbolts 11a are passed to hold the mating sections together. The rings also are bored transversely to receive bolts 12 which pass into threaded bores in the arm whereby the rings are mounted at the respective ends of the sleeve portion of the arm. It is to be noted that if the rings are mounted rigidly upon the sleeve portion of the arm they would interfere with the contraction or expansion of it through which clamping and unclamping is effected. However, in the present construction the bolts 12 are provided with shoulders 12a at their lower portion which seat upon the ends of the arm sleeve so as to space the heads of the bolts above the upper portions of the ring and thereby hold each ring in position without actually binding it rigidly. The transverse bores in the rings in turn are sufficiently large in diameter to provide some clearance for the bolts and it may be seen therefore that the sleeve portion of the arm may expand or contract slightly independently of the rings which are mounted upon it. The details of this structure are shown best in Figure 5.

In the preferred structure the outer endwise portions of the ring segments are chamfered toward the column, as at 13, to provide leading edges which act as shear wipers for the purpose of preventing the entrance of grit or dirt between the mating surfaces of the sleeve and column. Intermediate the wiping edges 13 and the annular recesses 9 of each ring segment, it is provided with an annular groove 14 to receive a circumferential gasket or packing 15 which embraces the column snugly. These gaskets, which if desirable may be backed up by flexible metal rings for reenforcement, are sufficiently thin so as to be flexible and are therefore pressed toward the column by means of compression springs 16 which are located at spaced radial positions about the periphery. The gaskets 15 prevent the escape of oil from the sleeve when oil is introduced into the recesses 9 under the pressure of the pump, as described at a later point in the specification, and they also supplement the wiping edges 13 to exclude grit and dirt from the bearing surface of the sleeve. The ring 10 at the lower portion of the arm sleeve also may be provided with an annular groove 16a (Figure 1) at its upper face to receive packing, whereby oil is prevented from seeping through the joint between the ring and the end of the sleeve. This is desirable inasmuch as oil tends to flow toward the lower portion of the sleeve and some clearance is necessary at this joint to provide for movability of the sleeve independently of the ring as previously explained.

In radial drills of the type wherein a key in the arm fits a keyway in the column to hold the arm against rotation the oil introduced into the annular oiling recess 9 will be discharged therefrom through the keyway opening. With such structures the annular recess is provided with a dam or filling of Babbitt metal or the like at the portion of the recess which is adjacent the keyway as indicated generally at 16b in Figure 2. Several small holes extending outwardly from the recess become filled up with Babbitt metal and therefore serve to prevent displacement of the Babbitt metal dam from the keyway area. Radial drill structures having a column fixed upon the base and not having the keyway need not be constructed in this manner.

The rings 10 at the upper and lower ends of the sleeve respectively are provided with inlet ports 17, which preferably are in vertical alignment, and these ports are joined with one another through a conduit 18 which, in turn, is fed with oil from the pump through an inlet line 19. A bleeder hole 17a may be provided in the upper ring at a point remote from the inlet port so as to vent air from the recess which, if trapped, would prevent satisfactory introduction of the lubricant.

The pump unit, indicated generally at 20, is mounted preferably at the back face of the arm upon a suitable machined surface and it comprises a casting which is hollow at its central portion to constitute a reservoir 21 equipped with a suitable sightglass 21a. The lower portion of the casting has a web 22 extending laterally across it, while the upper portion of the casting is partially closed through a top web 23 which is of substantial thickness. Caps 24 are mounted above the top web 23 and at the bottom of the unit. The top cap is provided with a suitable filler opening and the bottom cap is removable to allow the reservoir to be drained.

Lower web 22 is bored centrally to receive a gland 26 which, flanged as at 27 at its lower end, extends upwardly into the reservoir. This unit is held in place by means of cap screws 28 extending through flange 27 into the web 22. The upper portion of the gland 26 receives a plunger 29 which consists of a piston portion 30 and a rod or tail portion 31 which extends upwardly beyond the gland 26. The rod or tail portion 31 may be fixed to the piston portion 30 by means of a screw threaded section 32 which engages in the top screw threaded portion of a central bore 33 in the piston 30.

The tail portion 31 extends upwardly through the top web 23 of the pump casting and this top web has a laterally extending lug 34 which is set off to one side of the plunger stem. The lug is bored in a direction laterally of the stem, as at 35, to receive sleeves 36 which provide a journal for a rock shaft 37. The rock shaft extends out beyond the pump casting at one side thereof while the bore at the other side of the casting is plugged, as at 38.

Rock shaft 37 carries an actuating lever 39 which is keyed to it in the usual manner. This lever is of sufficient length to extend down below the pump casting and thereby be readily accessible for operation. The cross lug 34 has a recess 40 provided at the central portion of the casting to provide clearance for a rocker arm 41 which is fixed to the rock shaft 37. The free end of the rocker arm is slotted to receive a roller 42 which is rotatably mounted upon a pin 43, the rocker arm being positioned on shaft 37 for engagement of the roller 42 with the free end of the rod or tail portion 31.

Thus it may be seen that manipulation of the lever 39 in an outward direction, that is, away from the back of the arm, causes the pump plunger to be moved longitudinally within the cylinder 26.

The lower web 22 extends entirely across the bottom of the housing but contains apertures 45 to provide passageways through which oil can flow from the reservoir 21 into the cavity delineated by the lower cap 24. Within this cavity, indicated generally at 46, the lower portion of the gland 26 carries a valve seat member 47 which preferably is screwed into place on the gland. The valve seat member is bored and counterbored to provide an inlet opening 48 and a seat for a ball valve 49. A pin 50 extends transversely across the bore at a level spaced above the upper portion of the ball to limit the upward travel of the ball. Between the upper surface of the inlet member 47 and the lower portion of the rod 31 a compression spring 49a is interposed to urge the plunger in an upward direction, thereby returning the lever to its original position after it has been actuated.

The discharge from the pump is provided through a bore 51 which extends laterally from the pump chamber at a point above the inlet valve. At the outside of the housing, in a line with the outlet bore, a ring 52 is secured in place by means of screws radially spaced. This ring has a threaded bore to receive the discharge conduit 19 and unions 53 and 54 respectively are utilized in this line and in the line 18 to facilitate assembly of the apparatus.

Inwardly of the ring 52 there is a bushing 55 which provides a seat for a ball valve 56, this valve, in turn, being urged toward the seat by means of a spring 57.

The entire unit at its back face has a flange 58 which is bored to receive screws 59 through which the unit may be mounted rigidly to the drill arm. Through this arrangement it will be understood that the entire lubrication system travels with the arm throughout its movements on the column.

The recesses 9 in the ring segment portions 10 are continuous and, therefore, provide closed reservoirs from which oil may seep to the mating surfaces of the column and arm during usage of the machine. In place of this construction, the rings 10 may be omitted and the recesses may be cut directly into the surface of the sleeve at the marginal extremities thereof, but it is to be noted that with this construction oil introduced into the recesses under pressure from the pump tends to escape at the opening constituted by the longitudinal slot 5 of the sleeve. To avoid this difficulty, a compressible gasket 60 may be installed within the slot. With the ring structure previously described, however, this precaution is not necessary. In structures in which the sleeve is of substantial length the head of the oil being fed to the upper recess 9 may be sufficiently great to cause unequal distribution of the oil between the upper and lower recesses. In this event a constriction or metering opening as indicated by the dotted lines 59a may be located at the lower portion of the distributing conduit so as to equalize the distribution of lubricant between the upper and lower recesses.

As lubrication is required at the column, the operator of the machine actuates the lever 39 whereby a charge of oil previously accumulated in the cylinder is expelled therefrom through downward movement of the plunger. The lower inlet valve closes through seating of the ball 49 and the oil, therefore, is directed outwardly past the ball valve 56 which opens due to oil pressure, permitting the lubricating fluid to pass into the duct 19 for distribution between the upper and lower annular recesses 9. As the lever 39 is returned by the compression spring, a negative pressure is created in the cylinder thereby effecting closure of the valve 56 and opening of the lower valve 49 to permit oil to flow into the cylinder from the reservoir 21. The lubrication apparatus is utilized throughout the day whenever the column loses the film of oil which it is desired to maintain upon it.

Having described my invention, I claim:

1. In a radial drill, the combination with a column and a contractable sleeve translatably embracing said column, of an oiling device for lubricating the interface between the column and the sleeve, comprising a ring surrounding the column and located at an endwise portion of said sleeve, said ring being substantially incontractable and inexpansible and having an annular recess therein constituting a lubricating fluid reservoir, and means interconnecting said ring with said sleeve to restrain said ring against longitudinal movement with respect to said sleeve, said means being a floating connection permitting contracting movement of said sleeve independently of said ring.

2. In a radial drill, the combination with a column and a contractable sleeve translatably embracing said column, of an oiling device for lubricating the interface between the column and the sleeve, comprising a ring surrounding the column and located at an endwise portion of said sleeve, said ring being substantially incontractable and inexpansible and having a chamfered edge constituting a shear wiper for preventing the entrance of dirt between the mating surfaces of said column and sleeve, said sleeve also having an annular recess constituting a lubricating fluid reservoir, and means interconnecting said ring with said sleeve to restrain said ring against longitudinal movement with respect to said sleeve, said means being a floating connection permitting contracting movement of said sleeve independently of said ring.

3. In a radial drill, the combination with a column and a contractable sleeve translatably embracing said column, of an oiling device for lubricating the interface between the column and the sleeve, comprising a ring surrounding the column and located at an endwise portion of said sleeve, said ring being substantially incontractable and inexpansible and having recesses at its inner periphery, said recesses being spaced apart from one another, one of said recesses constituting a lubricating fluid reservoir, resilient sealing means contained in the other of said recesses to form a seal between said ring and said column, and means interconnecting said ring with said sleeve to restrain said ring against longitudinal movement with respect to said sleeve, said means being a floating connection permitting contracting movement of said sleeve independently of said ring.

4. In a radial drill, the combination with a column and a contractable sleeve translatably embracing said column, of an oiling device for lubricating the interface between the column and the sleeve, comprising a ring surrounding the column and located at an endwise portion of said sleeve, said ring being substantially incontractable and inexpansible and having a first annular recess constituting a lubricating fluid reservoir and a second annular recess forming a continuous cavity at the inner periphery of said ring for the reception of sealing material, sealing material interposed in said cavity, the outer end of said ring having a bevelled edge constituting a shear wiper for preventing the entrance of dirt between the mating surfaces of said column and sleeve, and means interconnecting said ring with said sleeve to restrain said ring against longitudinal movement with respect to said sleeve, said means being a floating connection permitting contracting movement of said sleeve independently of said ring.

5. In a radial drill, the combination with a column and a contractable sleeve translatably embracing said column, of an oiling device for lubricating the interface between the column and the sleeve, comprising a ring surrounding the column and located at an endwise portion of said sleeve, said ring being made of rigidly interconnected, substantially rigid segments, said segments having intercommunicating recesses therein which collectively form a continuous lubricating reservoir at the inner periphery of said ring, and means interconnecting said ring with said sleeve to restrain said ring against longitudinal movement with respect to said sleeve, said means being a floating connection permitting contracting movement of said sleeve independently of said ring.

6. In a radial drill, the combination with a column and a contractable sleeve translatably embracing said column, of an oiling device for lubricating the interface between the column and the sleeve, comprising rings surrounding the column and located at the respective endwise portions of said sleeve, said rings being substantially incontractable and inexpansible and having annular recesses therein constituting lubricating fluid reservoirs at the ends of the sleeve, and means respectively interconnecting the rings with the endwise portions of said sleeve to restrain said rings against longitudinal movement with respect to said sleeve, said means comprising floating connections permitting contracting movement of said sleeve independently of said rings.

7. In a radial drill, the combination with a column and a contractable sleeve translatably embracing said column, of an oiling device for lubricating the interface between the column and the sleeve, comprising a ring surrounding the column and located at an endwise portion of said sleeve, said ring being substantially incontractable and inexpansible and having an annular recess therein constituting a lubricating fluid reservoir, said ring having circumferentially spaced bores extending therethrough parallel with the axis of the ring and stub bolts projecting endwisely from the sleeve through the said bores in the ring and movably interconnecting said ring with said sleeve, said bolts including heads engaging the side of the ring opposite to the side which engages the sleeve, the bolts being smaller in diameter than the bores in said ring and having working clearances relative to the walls of the bores whereby the sleeve is contractable independently of said ring.

8. In a radial drill, the combination with a column and a contractable sleeve translatably embracing said column, of an oiling device for lubricating the interface between the column and the sleeve, comprising a ring surrounding the column and located at an endwise portion of said sleeve, said ring being substantially incontractable and inexpansible and having a continuous annular recess therein at its inner periphery, sealing means contained within said annular recess, yieldable elements interposed behind said sealing means for urging the sealing means in a direction toward the said column to form a substantially fluid-tight connection therewith, said ring including channel means for delivering oil to the contacting faces of the ring and column between said fluid-tight connection and said sleeve, and means interconnecting said ring with said sleeve to restrain said ring against longitudinal movement with respect to said sleeve, said means being a floating connection permitting contracting movement of said sleeve independently of said ring.

WILLIAM G. HOELSCHER.

REFERENCES CITED

The following references are of record in the file of this patent:

UNITED STATES PATENTS

| Number | Name | Date |
|---|---|---|
| 880,680 | Matthews | Mar. 3, 1908 |
| 1,000,791 | Erikson | Aug. 15, 1911 |
| 1,900,437 | Durham | Mar. 7, 1933 |
| 2,164,518 | Hart | July 4, 1939 |
| 2,209,938 | Schauer | July 30, 1940 |